May 17, 1966 F. PFLEIDERER ET AL 3,251,946

TIME MULTIPLEX COMMUNICATION SYSTEM COMPRISING A FOUR-WIRE MULTIPLEX BAR CONTAINING AN AMPLIFIER DEVICE

Filed Sept. 24, 1962 3 Sheets-Sheet 1

May 17, 1966 F. PFLEIDERER ET AL 3,251,946

TIME MULTIPLEX COMMUNICATION SYSTEM COMPRISING A FOUR-WIRE MULTIPLEX BAR CONTAINING AN AMPLIFIER DEVICE

Filed Sept. 24, 1962 3 Sheets-Sheet 3

United States Patent Office 3,251,946

Patented May 17, 1966

3,251,946

TIME MULTIPLEX COMMUNICATION SYSTEM COMPRISING A FOUR-WIRE MULTIPLEX BAR CONTAINING AN AMPLIFIER DEVICE

Friedrich Pfleiderer, Munich-Solln, and Max Schlichte, Munich, Germany, assignors to Siemens & Halske Aktiengesellschaft, Berlin and Munich, Germany, a corporation of Germany Filed Sept. 24, 1962, Ser. No. 225,724
Claims priority, application Germany, Sept. 26, 1961, S 75,935
19 Claims. (Cl. 179—15)

Figure 1:
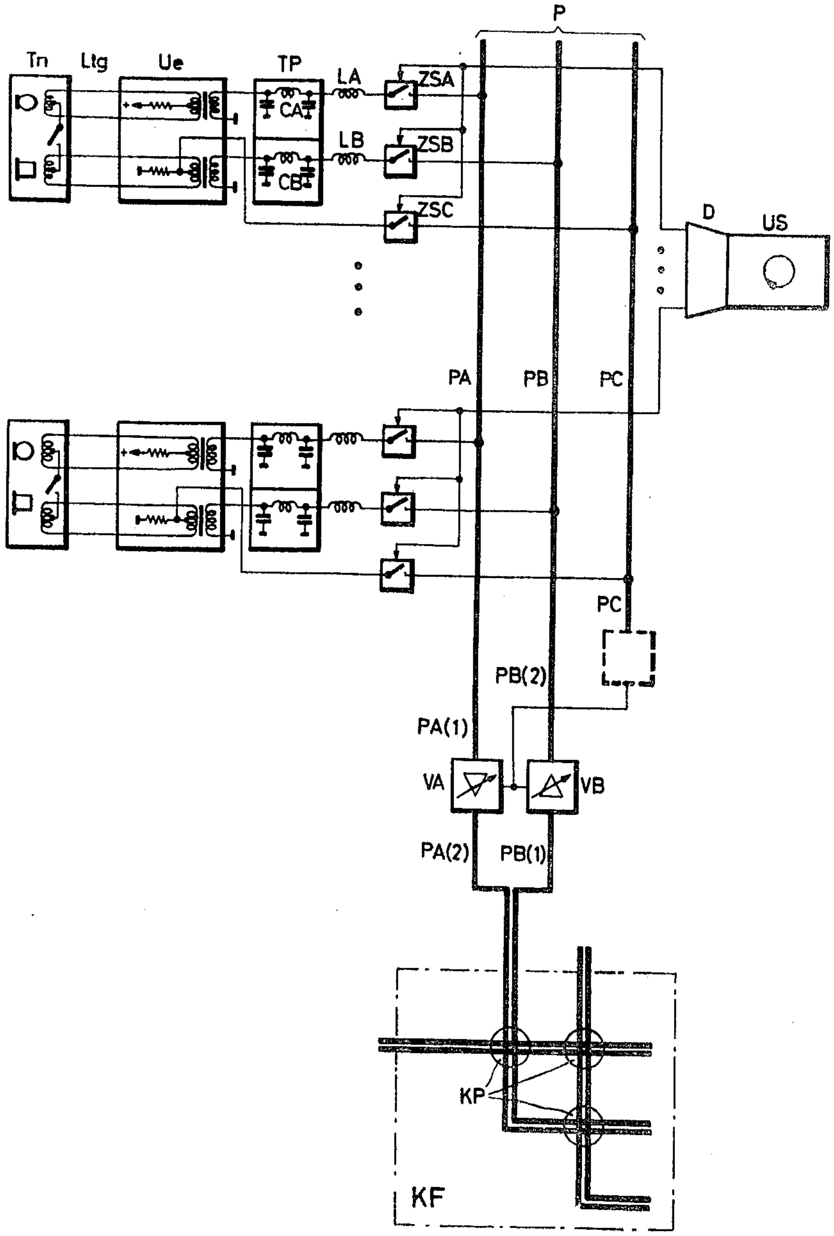

The invention disclosed herein relates to time multiplex systems for use in the communication arts and especially in telephony, that is, systems wherein messages to be exchanged between parties are modulated on impulse trains or sequences which are mutually displaced and therefore can be joined in interlaced fashion upon multiplex bars, thereby enabling plural utilization of connection paths. Such time multiplex communication systems can be constructed in various ways. The invention is concerned with time multiplex systems having four-wire multiplex bars to which subscriber lines or the like are periodically in impulse-like manner connectible with the aid of time channel switches.

In such time multiplex communication systems, the signals, in a telephone system especially the speech signals, must often be transmitted over lines of different length, and such signals are accordingly differently attenuated. However, the attenuation of a communication line, which may in given cases include various line sections, for example, the lines of the two end stations and the connection path within the communication system, must not exceed a specific maximum value. This requirement can generally be met by the provision of line amplifiers for increasing the signal power level that had been reduced owing to the line attenuation. Such line amplifiers can be fixedly disposed, for example, in a subscriber line or in a trunk line connected with a distance exchange, the gain of the respective amplifier being thereby adjusted in accordance with the degree of attenuation of the corresponding line or trunk. The line amplifier may in such a case also comprise an attenuation member with appropriately adjusted degree of attenuation and an amplifier proper with constant gain, serially connected therewith.

The invention proceeds from the known fact that amplifiers for raising the signal power level, can be inserted in the four-wire multiplex bar of time multiplex communication systems of the initially indicated kind. See, for example, German Patent No. 947,249, page 2. The amplifiers are thus in a sense centrally located and amplify in identical manner the speech signals of all speed circuits extended over the corresponding multiplex bar; it being understood, of course, that the gain of the amplifier must be selected so that it also suffices for the speech circuit with the strongest line attenuation. Such arrangement reduces the expenditures considerably as compared with the use of amplifiers individual to the respective subscriber lines.

It was, however, found that the amplification with the aid of a centrally located amplifier does not meet actual operation requirements, providing, as it does, an amplification which is unnecessary and often excessive for speech circuits with relatively slight line attenuation, so that further requirements placed on the corresponding connection cannot be met, for example, with respect to crosstalk. On the other hand, if the amplification were reduced so as to meet these further requirements, it would be insufficient for the speed circuits with the strongest line attenuation.

Difficulties resulting from the above indicated conditions can in given situations nullify the advantage of greatly reduced expenditure, gained by the use of a centrally disposed amplifier inserted in the multiplex bar, as compared with the use of an individual amplifier for each subscriber line.

The present invention overcomes these difficulties, in connection with the initially described system, by the provision of means for controlling the gain of the centrally located amplifier, during each speech phase in which a subscriber line is connected to the multiplex bar, by the action of a control signal which is produced as a function of the attenuation of the line involved in a call.

It is therefore possible, in the time multiplex system according to the invention, to always set the gain of the amplifier device inserted in the multiplex bar, that is, at each speech phase, as is required in accordance with the attenuation of the line connected at such speech phase with the multiplex bar. It is in this manner possible to obtain for each connection the same line attenuation, irrespective of the kind and length of the line sections involved, while using only one amplifier device of all connections which are extended, bundled as to time, over the multiplex bar.

Details of the invention will appear from the description which is rendered below with reference to the accompanying drawings.

Figure 2:
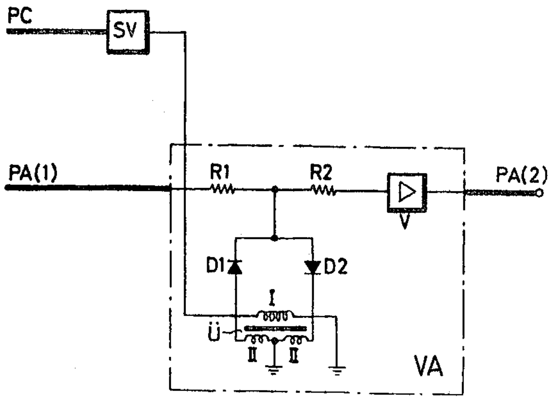
Figure 3:
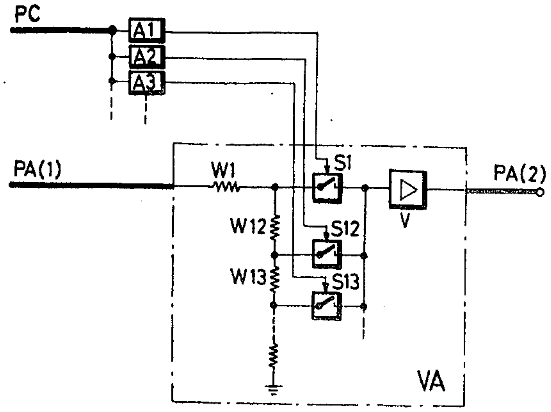
Figure 4:
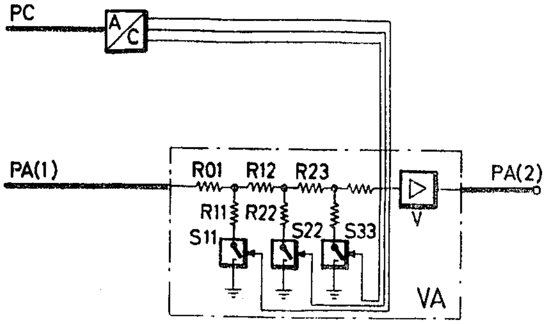
Figure 5:
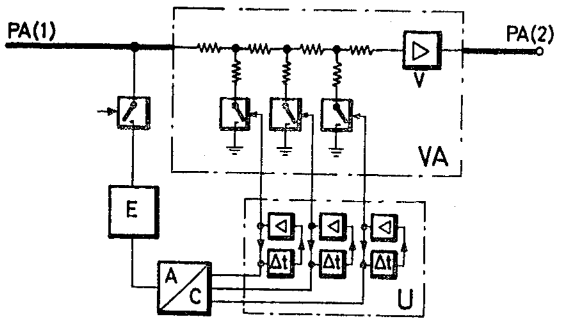
Figure 6:
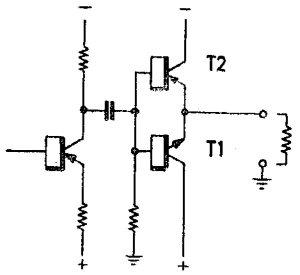

FIG. 1 shows portions of a time multiplex telephone system to the extent required for an understanding of the invention;

FIGS. 2 to 4 indicate embodiments of amplifier devices the gain of which is operatively controlled during each speech phase in which a line is connected to the multiplex bar, by a control signal denoting the attenuation of the corresponding line;

FIG. 5 represents a portion of a time multiplex system in which a brief pilot signal is transmitted from a subscriber station upon initiating a call, such signal being utilized as a criterion for the control of the attenuation member; and FIG. 6 shows an amplifier circuit comprising transistors for amplifying respectively positive and negative speech signals.

To the time multiplex telephone system shown in FIG. 1 are connected four-wire lines or trunks L*tg* leading respectively to subscriber stations T*n* or to other exchanges, whereby lines or trunks proper may in given cases be in the form of two-wire lines which fork into four-wire lines upon entering the system. The corresponding lines (or trunks) can be connected over time channel switches ZSA, ZSB . . . to the four-wire multiplex bar P which comprises an outgoing line PA to which are connected the lines extending from the subscriber stations to the system, and an incoming line PB to which are connected the lines extending from the system to the subscriber stations.

The time channel switches are controlled by control pulses which are delivered by cyclic storers such as indicated at US. In such cyclic storer are cycled, in coded form, the call numbers of subscribers involved in calls, such call numbers being also referred to as addresses. To the output of the cyclic storer is connected a socalled triggering decoder D, the number of outputs of each decoder corresponding to the number of subscriber stations connected to the system, each such output being assigned to a definite subscriber station. Responsive to extending to a triggering decoder the address of a subscriber station, an impulse is given off at the output of the respective decoder, which impulse is assigned to the respective subscriber, such impulse serving for operatively controlling the time switch such as ZSA, ZSB, which is assigned to the corresponding subscriber. The line L*tg* of a subscriber station T*n* which is involved in a call, is in this manner briefly connected with the multiplex bar P. This is periodically repeated with the cycling period of the addresses which are being cycled in the cyclic storer US, thereby effecting the desired connection between the respective line Ltg and another line which is synchronously thereto connected with its multiplex bar, such latter bar being at least during the corresponding switching instants connected with the first noted multiplex bar P.

The connection which is to be effected in this manner can be made with the aid of a suitable coupling network KF to which the two lines PA and PB of the multiplex bar P are connected over terminals PA(2) and PB(1), such network having for each pair of multiplex bars P which are to be interconnected, a coupling point KP. Coupling networks which are suitable for this purpose, are known, and further explanations with respect thereto are therefore omitted, particularly since they are not required for an understanding of the invention.

If desired, connections between lines of one and the same time multiplex communication system can also be effected with the use of speech energy storers provided in known manner in a given system and connected with the corresponding multiplex bar in place of subscriber stations or toll trunks, whereby the two lines are at different instants in known manner connected to the multiplex bar, the intervening pauses being thereby bridged with the aid of the speech energy storers.

In the multiplex bar P of the system shown in FIG. 1, is inserted an amplifier arrangement comprising amplifier devices VA and VB, which are respectively disposed in the lines PA and PB serving for the transmission of speech energy in opposite directions. An amplifier device such as VA, VB is during each speech phase, in which a line Ltg is connected with the multiplex bar P, operatively controlled as to the gain thereof, by a control signal acting as a function of the line attenuation of the respective line Ltg. The multiplex bar P of the embodiment according to the invention, as shown in FIG. 1, is for this purpose provided with an auxiliary control line PC to which can be periodically impulse-wise connected, with the aid of the time channel switches comprising respectively an auxiliary contact ZSC, points of the lines Ltg which are traversed only by the direct current loop current. Such a point may, for example, lie in the direct current battery feed of the respective subscriber line. The control input of the amplifier devices VA, VB is connected with the auxiliary control line PC, if desired over appropriate intermediate devices to be presently described, so that a control signal is in given cases conducted to the amplifier devices VA, VB, such control signal corresponding to the amplitude of the direct current flowing in the line Ltg which is at a given speech phase momentarily connected with the multiplex bar P.

As shown in FIG. 1, the control signal corresponding to the direct current flowing in the line loop, the amplitude of which is a function of the line attenuation, can be derived, for example, from a line repeater Ue which terminates the line Ltg and which is inserted between the line Ltg and the low pass filter TP with the storage capacitor CA or CB, respectively, such low pass filter being connected ahead of the respectively associated time channel switch such as ZSB. The control signal for a speech phase is thereby newly formed in each operating period, that is, upon each closure of the contacts ZSA and ZSB which effects connection of a line Ltg with the multiplex bar P, since the contact ZSC of the time channel switch is at such instants likewise closed.

However, it may be mentioned here that it is also possible to determine the control signal which is to be utilized during each speech phase, upon initiation of a call, and to enter the signal thus determined in a cyclic storer which releases it periodically to the amplifier devices in timing with the speech phase, in a manner to be presently described in connection with another embodiment.

However, there shall first be described more in detail, with reference to FIGS. 2 to 4, some embodiments of such amplifier devices which are respectively operatively controlled, as to the gain thereof, during each speech phase in which a line is interconnected with the multiplex bar, by a control signal acting as a function of the line attenuation of the respective subscriber line. It is deemed sufficient to limit the explanation to one of the two amplifier devices VA, VB, which are respectively individually interposed in the lines PA, PB of the multiplex bar P. Each amplifier device VA and VB comprises an attenuation member with controllable attenuation and an amplifier with constant gain.

The amplifier device, for example, the device VA comprises, in the embodiment according to FIG. 2, an attenuator formed by a T-member with two ohmic longitudinal resistors R1 and R2 and two directional conductors or diodes D1, D2, disposed antiparallel in the transverse branch. The two diodes are by the control signal which is conducted to the amplifier device VA, operatively controlled with respect to the dynamic impedance thereof. One half of the secondary winding II of a transformer U is for this purpose serially connected with each of the two diodes D1 and D2, the primary winding I of the transformer being connected with the control line PC of the multiplex bar P shown in FIG. 1, whereby a signal amplifier SV may be interposed between the control line PC and the primary winding I.

Whenever a subscriber line is impulse-wise connected with the multiplex bar P, there will appear on the line PC a control signal impulse the amplitude of which corresponds to the direct current flowing in the loop of the respective subscriber line. The strength of this control impulse will depend upon the attenuation of the line loop; the lower the attenuation is, the stronger will be the control impulse. This control impulse acts over the transformer U on the diodes D1 and D2, causing such diodes to become with increasing amplitude increasingly conductive. The dynamic impedance of the diodes is thereby reduced, so that these diodes become increasingly conductive for the speech signals appearing thereon. The speech energy which is to be transmitted over the amplifier device VA is therefore stronger attenuated in the T-member. It is of course understood that only a small part of the characteristic curve of the diodes must be triggered by the respective speech signal which is delivered in the form of a bipolar amplitude modulated impulse. The speech signal is thereupon amplified by a constant amount in the amplifier proper indicated at V. The attenuation is, depending upon the amplitude of the control impulse and therefore depending upon the attenuation of the subscriber line that happens to be connected with the multiplex bar, such that the desired speech signal power level is obtained at the output of the amplifier V. If required, the control range may be extended by the provision of a chain circuit of a plurality of T-members. It is of course understood that other suitable non-linear resistors may be used in such T-members in place of the diodes.

In the time multiplex communication system shown in part in FIG. 3, the attenuation member or attenuator is formed by an ohmic voltage divider comprising the resistors W1, W12, W13 . . . logarithmically staged or staggered resistance values are obtained at the tapping points of this voltage divider; the tapping points can be connected with the input of the successively disposed amplifier proper, indicated at V, over preferably electronic switches S1, S12, S13 . . . such switches being operable depending upon the control signal conducted to the partial amplifier device VA. Amplitude band pass filters A1, A2, A3 . . . are for this purpose respectively disposed ahead of the control input of each individual switch S1, S12, S13 . . ., the control signal being conducted to the respective band pass filter. Amplitude band pass filters are known and further explanations with respect thereto are therefore omitted at this point.

As in the previously described embodiment, whenever a subscriber line is connected to the multiplex bar of the system shown in part in FIG. 3, there will appear on the line PC a control signal impulse with an amplitude corresponding to the direct current flowing in the respective subscriber line loop. Depending upon its amplitude, such control signal is over one of the amplitude band pass filters A1 . . . transmitted to the control input of one of the switches S1 . . ., and the corresponding switch, which is allocated to the respective control impulse amplitude, is thereby impulse-wise closed, coincident with the operation of the time channel switch of the respective subscriber line. In the case of a control impulse with high amplitude, that is, at low line attenuation, one of the lower switches will be closed, for example, the switch S13, while one of the upper switches, for example, the switch S12 will be closed responsive to a control impulse with lower amplitude. The tap of the voltage divider to which the corresponding switch is connected, is thereby extended to the successively disposed amplifier V, thereby providing at the input of the amplifier always the same speech signal power level irrespective of the line attenuation of the subscriber line that may be involved. It is of course understood that the amplifier V can be disposed ahead of the voltage divider, with the appropriate voltage divider tap connected directly with the output of the partial amplifier device VA.

The quantizing of the direct current loop signal given off by the line PC of the multiplex bar P can as described be effected with the aid of amplitude band pass filters. The staging index must not be too small so as avoid disturbing quantizing noises. The number of stages may however be reduced in the event that the control signal is not newly formed during each operating period, coincident with each speech phase, but is determined, as will be explained in connection with a further embodiment which will be presently described, upon initiation of a call and is entered in a cyclic storer which delivers the control signal periodically to the amplifier device always during the speech phase.

The switches such as described herein may be generally in known manner constructed as electronic switches. The number of such switches used, for example, in the embodiment described with reference to FIG. 3, may be reduced by constructing the attenuator device, according to the invention, of a chain of ohmic resistors R01, R11, R12, . . . , forming elements of T-members, as shown in FIG. 4, comprising electronic switches such as S11, S22, . . . disposed in the transverse branches thereof, the respective switches being operatively actuated responsive to control signals and thereby activating the corresponding T-members. The individual T-members of the chain may thereby effect different attenuation; especially the contribution of the individual T-members of the chain, with respect to the total attenuation, may be staged in a ratio of 1:2:4. The direct current loop signal may again serve for the operative control of the switches S11, S22, S33, such signal being for this purpose converted into a binary control signal by a code converter A/C which is connected ahead of the respective inputs of the switches. Various T-members are in this manner simultaneously activated, depending upon the more or less strong attenuation of the subscriber line (or trunk line) which happens to be momentarily connected to the multiplex bar of the communication system, thus resulting in more or less attenuation effected by the action of the T-members. Quantizing disturbances can in such embodiment be likewise avoided, as in the previously described example, by sufficiently fine staging or staggering in the control signal conversion.

However, instead of newly forming the control signal for each working period, it may be more advantageously formed incident to the initiation of a call and entered into a cyclic storer which releases such signal periodically to the amplifier device, always coincident with the speech phase. FIG. 5 shows an example of an embodiment of a time multiplex communication system made according to the invention and operating in this manner.

In FIG. 5, the attenuator is again formed by a chain of T-members comprising ohmic resistors. However, between the coder A/C and the individual switches of the attenuation device is disposed a cyclic storer U which comprises a plurality of partial storers. Each of these partial storers may be formed by a magnetostrictive cyclic storer comprising an amplifier and a timing device $\Delta t$. The control signal which is determined upon initiation of a call to be effected on a given speech phase and which may be converted in the coder A/C, is entered into this cyclic storer and is thereby cycled with a timing corresponding to the working period of the system. The stored control signal will in each working period appear at the output of the cyclic storer at the instant at which the subscriber line, involved in the corresponding call, is impulse-wise connected with the multiplex bar, thus being again entered in the storer and effecting the operative control of the respective switch of the attenuation device. Accordingly, the same switches are actuated in the speech phases of a call, for the duration thereof, thereby avoiding quantizing noises.

The system shown in part in FIG. 5, does not use the direct current loop signal as a criterion for the control of the attenuation member or device, but a pilot signal which is upon initiation of a call momentarily transmitted from a subscriber station. Such a pilot signal may be produced, for example, by devices which are for the tone frequency selection as a matter of course included in the respective subscriber station. The amplitude of this pilot signal, which appears on the line PA (see also FIG. 1) of the multiplex bar P, to which speech energy is conducted from the subscriber lines, depends of course upon the attenuation of the line extending to the corresponding station, and such pilot signal can therefore be utilized for the operative control of the amplifier devices such as VA and VB. Character E in FIG. 5 indicates a pilot signal receiver which is connectible to the line PA of the multiplex bar and which extends, if desired in cooperation with a coder A/C, the control signal corresponding to the pilot signal received from a subscriber line, to the cyclic storer U at the speech phase utilized for the respective call.

The foregoing explanations which are primarily directed to operations involving lines extending to subscriber stations, are however, as said before, likewise applicable in the case of operations involving exchange lines or trunks. It may be sufficient in such cases, especially in the case of lines operating with carrier frequency, to allocate to each exchange line a given direct voltage corresponding to the previously determined attenuation, which voltage can be produced with the aid of a voltage divider and utilized for the operative control of the amplifier device which is inserted in the multiplex bar. Accordingly, the control signal would in such case not be derived respectively from a line PC or PA of the multiplex bar, as in FIGS. 1–5, but would be derived from this direct voltage source.

The speech signals which are attenuated by the attenuation member of the respective amplifier device VA, VB, depending upon the attenuation obtaining on the line which happens to be connected with the multiplex bar, must thereafter be amplified. This is in the embodiments shown in FIGS. 2 to 5 effected with the aid of the amplifier V included in the respective partial amplifier device such as VA. The output power of the amplifier V corresponds thereby to the number and the respectively required speech signal power level of the individual speech circuits of a time multiple, and lies approximately in the order of magnitude of 1 watt. Since the output signal is bipolar and since the source for such signal must have a very low internal impedance, it is advantageous to use in the end stage of the amplifier a push-pull stage constructed of two complementary transistors which are operated in collector circuit. Such an amplifier circuit is indicated in FIG. 6. The positive signals are thereby amplified by the n-p-n transistor T1 while the negative speech signals are amplified by the p-n-p transistor T2.

Changes may be made within the scope and spirit of the appended claims which define what is believed to be new and desired to have protected by Letters Patent.

We claim:

1. A time multiplex communication system having individual lines, each of which are with the aid of time channel switches impulse-wise periodically connectible, during a corresponding speech phase, with a four-wire multiplex bar, comprising a central amplifier device, included in said multiplex bar, for individually controlling the power level of signals conducted over the line connected therewith during the corresponding speech phase, means for producing for each such line, according to an input signal dependent upon the attenuation thereof, coincident with such speech phase, a control signal which denotes the attenuation of the respective line, and means connected at this speech phase to the multiplex bar, governed by said signal for controlling the operation of said amplifier device as to the gain thereof.

2. A time multiplex system according to claim 1, wherein said multiplex bar comprises a control conductor, means for connecting said control conductor with the control input of said amplifier device, and time switch means for connecting with said control conductor points of the respective lines at which is obtained a control signal denoting the attenuation thereof.

3. A time multiplex system according to claim 2, wherein said control signal is newly formed incident to each speech phase.

4. A time multiplex system according to claim 1, comprising means to which the control signal is conducted for determining the latter for a given speech phase upon initiation of the corresponding connection, a cyclic storer, means operatively connecting the latter and said last-mentioned means for entering said signal into said storer, and means in said storer for periodically delivering said control signal to said amplifier device coincident with the respective speech phase.

5. A multiplex system according to claim 1, wherein said multiplex bar comprises a control conductor, means for connecting said control conductor with the control input of said amplifier device, and time switch means for connecting to said control conductor direct voltages assigned to the respective lines and denoting the attenuation thereof.

6. A time multiplex system according to claim 1, wherein said multiplex bar comprises a control conductor, time switch contact means for periodically impulse-wise connecting to said control conductor points of said lines which are only traversed by the direct current flowing in the respective line loops, and means for connecting said control conductor with the control input of said amplifier device so as to conduct thereto control signals corresponding to the amplitude of the loop current flowing in the respective line loop.

7. A time multiplex system according to claim 1, wherein a pilot signal is transmitted from a line involved in the extension of a connection, comprising a pilot receiver connectible with the conductor of said multiplex bar to which is conducted the signal energy from the respective line, said pilot receiver being connected with and transmitting to said amplifier device a control signal corresponding to said pilot signal.

8. A time multiplex system according to claim 1, wherein said central amplifier device comprises two amplifier devices which are respectively inserted, one in each conductor of said multiplex bar over which signal energy is transmitted with respect to lines involved in a connection.

9. A time multiplex system according to claim 8, wherein each of said two amplifier devices comprises an amplifier with constant gain, and attenuation means with controllable attenuation produced thereby operatively connecting such amplifier to the associated conductor of said multiplex bar.

10. A time multiplex system according to claim 9, wherein said attenuation means comprises at least one T-member having two longitudinal ohmic resistors and having in the transverse branch antiparallel connected diodes the dynamic impedance of which is governed by said control signal.

11. A time multiplex system according to claim 10, comprising a transformer, means for connecting one half of the secondary winding of said transformer in series with the respective diodes, and means for connecting the primary winding of said transformer with a control conductor of said multiplex bar over which is conducted the control signal.

12. A time multiplex system according to claim 11, comprising an amplifier disposed between said control conductor and the primary winding of said transformer.

13. A time multiplex system according to claim 9, wherein said attenuation means comprises an ohmic voltage divider at the tapping points of which are obtained logarithmically staged resistance values, electronic switch means for connecting the respective tapping points with the input of said amplifier, and means for activating the respective switch means under control of the control signal.

14. A time multiplex system according to claim 13, comprising an amplitude band pass filter connected ahead of the input of each switch means, and means for conducting the control signal to the respective filters.

15. A time multiplex system according to claim 9, wherein said attenuation means comprises a chain of T-members formed by ohmic resistors, electronic switch means disposed in the transverse branches of the respective T-members, the actuation of said switch means being governed by the control signal to activate the respective T-members.

16. A time multiplex system according to claim 15, wherein the individual T-members produce different attenuation.

17. A time multiplex system according to claim 16, wherein the individual T-members produce attenuation in a ratio of 1:2:4 . . . .

18. A time mupltiplex system according to claim 17, comprising a coding device for converting the respective control signal into a binary signal for controlling the actuation of said switch means, and circuit means for connecting the outputs of said coding device with the inputs of the respective switch means.

19. A time multiplex system according to claim 9, wherein the end stage of said amplifier contains two mutually complementary transistors circuited in push-pull manner and operating in collector circuit.

References Cited by the Examiner

UNITED STATES PATENTS

| | | | |
|---|---|---|---|
| 2,231,538 | 2/1941 | Kreer | 179—15 |
| 2,757,283 | 7/1956 | Ingerson et al. | 325—41 |
| 2,890,285 | 6/1959 | Bogert et al. | 179—15 |
| 2,987,577 | 6/1961 | Faulkner | 179—15 |

FOREIGN PATENTS 592,555 9/1947 Great Britain.

DAVID G. REDINBAUGH, *Primary Examiner.*

T. G. KEOUGH, *Assistant Examiner.*